US007263542B2

(12) United States Patent
Den Brinker

(10) Patent No.: US 7,263,542 B2
(45) Date of Patent: Aug. 28, 2007

(54) INVERSE FILTERING METHOD, SYNTHESIS FILTERING METHOD, INVERSE FILTER DEVICE, SYNTHESIS FILTER DEVICE AND DEVICES COMPRISING SUCH FILTER DEVICES

(75) Inventor: Albertus Cornelis Den Brinker, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 724 days.

(21) Appl. No.: 10/476,041

(22) PCT Filed: Apr. 29, 2002

(86) PCT No.: PCT/IB02/01545

§ 371 (c)(1),
(2), (4) Date: Oct. 28, 2003

(87) PCT Pub. No.: WO02/089116

PCT Pub. Date: Nov. 7, 2002

(65) Prior Publication Data

US 2004/0136268 A1 Jul. 15, 2004

(30) Foreign Application Priority Data

May 2, 2001 (EP) .................................. 01201615

(51) Int. Cl.
*G06F 17/10* (2006.01)

(52) U.S. Cl. ...................................... 708/319; 708/322

(58) Field of Classification Search ................ 708/319, 708/322

See application file for complete search history.

(56) References Cited

U.S. PATENT DOCUMENTS

| | | | | |
|---|---|---|---|---|
| 4,809,209 | A * | 2/1989 | White | 708/319 |
| 5,285,475 | A * | 2/1994 | Kurokami | 375/233 |
| 5,553,014 | A * | 9/1996 | De Leon et al. | 708/322 |
| 6,035,312 | A * | 3/2000 | Hasegawa | 708/322 |

OTHER PUBLICATIONS

Flanagan "Speech Analysis Synthesis and Perception" 1972, pp. 390-395.*

* cited by examiner

*Primary Examiner*—D. H. Malzahn

(57) ABSTRACT

An inverse filtering method, comprising: generating a first filtered signal based on an input signal; and combining the first filtered signal with the input signal for obtaining a residual signal. The generating comprises: generating at least two second filtered signals, each of said second filtered signals not significantly delayed in time relative to each other, the generating being stable and causal; and amplifying at least one of the second filtered signals with a prediction coefficient.

29 Claims, 4 Drawing Sheets

INVERSE FILTERING METHOD, SYNTHESIS FILTERING METHOD, INVERSE FILTER DEVICE, SYNTHESIS FILTER DEVICE AND DEVICES COMPRISING SUCH FILTER DEVICES

The invention relates to an inverse filtering method. The invention further relates to a synthesis filtering method. The invention also relates to an inverse filter device, a synthesis filter and devices comprising such filter devices. The invention also relates to a computer program for performing steps of a method according to the invention.

From A. Härmä, "Implementation of frequency-warped recursive filters", *Signal processing* 80 (2000) 543-548, a filter device is known. The "Härmä" article des a warped linear prediction (WLP) encoder and a WLP decoder. The WLP encoder device comprises a conventional FIR filter in which its unit delays are replaced with first-order all-pas filters.

A disadvantage of the encoder device known from this 'Härmä' article is that without further measures the WLP decoder device would contain delay-free loops. In the Härmä article, two solutions to this problem are described. Firstly, the WLP decoder device may be adapted in order to eliminate the delay-free loops. Secondly, the computation of the decoder output and updating of the inner states of the filter may be separated. In both solutions, the WLP decoder device differs from the WLP encoder device. Furthermore, because of the difference between encoder and decoder, the parameters of the WLP encoder device, such as the prediction coefficients, have to be converted to the WLP decoder, which requires extra processing and is associated with numerical problems.

It is therefore a goal of the invention to provide an encoder device and decoder device which may be similar of design.

Thereby, the synthesis filter does not contain delay-free loops because a delay is provided. Hence, the inverse filtering and the synthesis filtering may be substantially similar.

Furthermore, the invention provides a synthesis filtering method, an inverse filter device, a synthesis filter device and devices comprising such filter devices. The invention also provides to a computer program for performing steps of a method according to the invention.

Specific embodiments of the invention are set forth in the dependent claims. Further details, aspects and embodiments of the invention will be described with reference to the attached drawing.

In this application, the following terms are used. A sample x(n) is an instance of a signal at a certain moment. A segment is a number of successive samples, for example x(n), x(n+1) . . . x(n+j−1), x(n+j). Where in this application one of the terms signal, sample or segment is used, another one of these types may be read as well. A transfer function H(z) is the relationship between the input signal and the output signal of a filter, seen in the z-domain. (For $z=\exp^{-i\theta}$, i being the square root of −1, H(z) yields the characteristics in the frequency domain. The impulse response of a filter is the response of the filter to an impulse signal, that is a signal having a value of 1 for n is zero and a value of 0 if n is not zero, n indicating a moment in time. In this application, a filter device is understood not to be a device having only a delay device or multiple delay devices although in a very strict sense a delay device is a filter device. However a device including at least one filter device and one or more delay devices is understood to be a filter device. A filter is at least understood to be causal if the output signal does not depend on any "future" input signals, that is the output of the filter is only dependent on a current signal and/or previous signals. A filter is said to be stable if the filter gives an amplitude bounded output signal for any arbitrary amplitude bounded input signal presented at the filter input.

Figure 1:
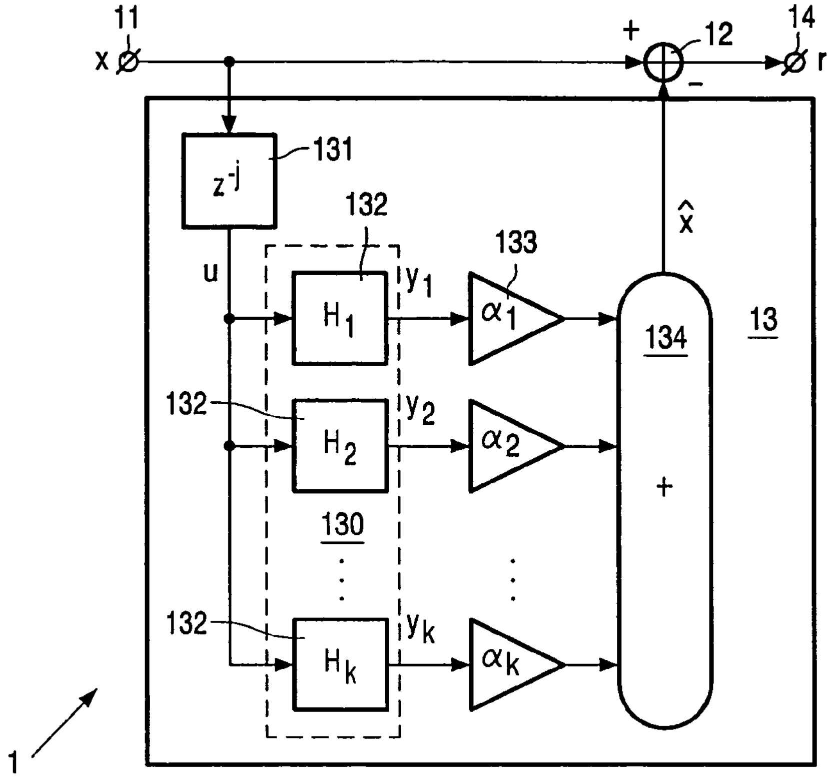
FIG. 1 shows a block diagram of a first example of an embodiment of an inverse filter device according to the invention.

FIG. 1 shows a block diagram of a first example of an embodiment of an inverse filter device 1 according to the invention. The shown example of an inverse filter device or encoder device 1 comprises an input port 11 at which an input signal x may be presented. The input port is connected to a filter structure 13 which is able to filter the received the input signal x and is able to output a first filtered signal $\hat{x}$. The input port 11 and the filter structure 13 are both connected to a first combiner device 12 which is able to combine the first filtered signal $\hat{x}$ and the input signal x whereby a residual signal r is obtained.

The filter structure 13 comprises a buffer or memory device 131 connected to the input port 11 and a plurality of second filter devices 132 connected to the output of the device 131. In the shown example, the second filter devices 132 form a single input multiple output (SIMO) filter device 130. The second filter devices 132 are also connected to amplifier devices 133 which are further connected to a second combiner device 134. The combiner device 134 is connected with an output to the first combiner device 12.

The buffer or memory device 131, in this application also referred to as a delay device, stores the received input sample x(n) and releases a sample u(n). The sample u(n) is a previous sample x(n−j) of the input signal, with j representing the delay of the device and j being larger than zero. Thus, a sample u(n) of the previous input signal u is equal to a sample x(n−j) of the input signal x, with j representing the delay of the delay device 131 and j being larger or equal to zero. The second filter devices 132 generate second filtered signals $y_1, y_2, \ldots, y_k$ based on the signal u. The second filter devices are stable and causal. Thus the SIMO filter device 130 is stable and causal as well. In the embodiment, the SIMO filter device 130 comprises only second filter devices 132. However the SIMO filter device may also contain one or more delay devices or even a direct feed through in parallel with the second filter devices 132.

The amplifier devices 133 amplify or multiply each second filtered signal $y_1, y_2, \ldots, y_k$ with an amplification or multiplication factor $\alpha_1, \alpha_2, \ldots, \alpha_K$. From this amplification factors $\alpha_1, \alpha_2, \ldots, \alpha_K$ are referred to as the prediction coefficients $\alpha_1, \alpha_2, \ldots, \alpha_K$, where the prediction coefficients are time-varying or signal-dependent. Thus, the second filtered signals are combined as a weighted sum by the second combiner device 134.

The output of the second combiner device 134 is the first filtered signal $\hat{x}$ where each sample $\hat{x}(n)$ is thus based on previous samples x(n−j) of the input signal x, with j greater than zero. The second combiner device 134 outputs the first filtered signal $\hat{x}$ and presents the first filtered signal $\hat{x}$ to the first combiner device 12. The first combiner device 12 combines the input signal x with the first filtered signal $\hat{x}$ and obtains a residual signal r.

Figure 2:
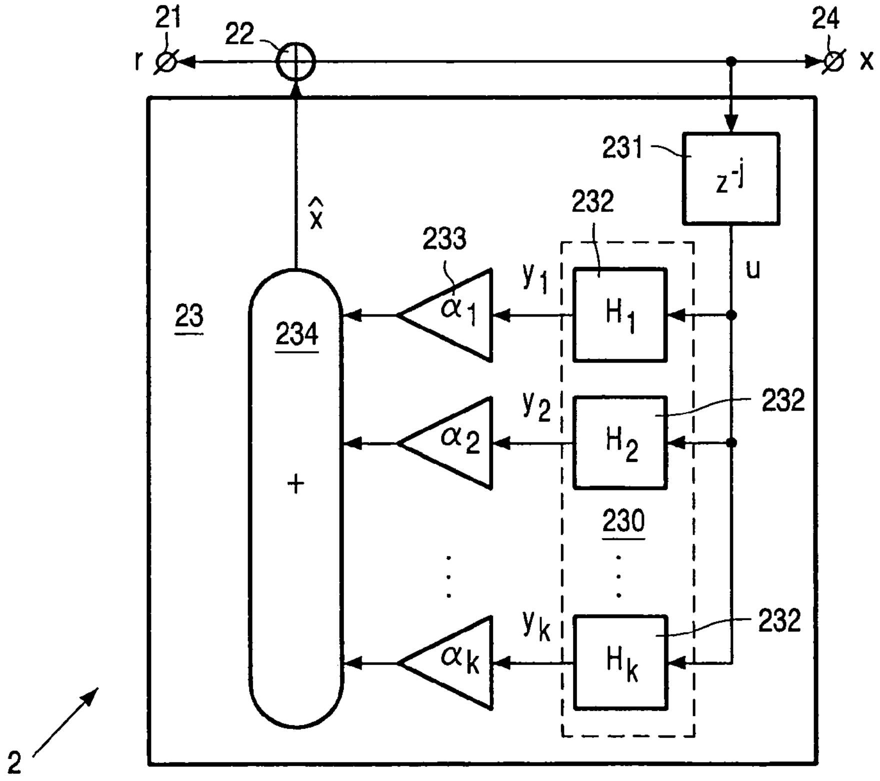
FIG. 2 shows a block diagram of a first example of an embodiment of a synthesis filter device according to the invention.

Because of the delay device 131, there are no delay free loops present in the filter structure 13. Thereby, both the inverse filter and the synthesis filter may be of the same design, i.e. the filters may be made complementary to each other. For example, the example of an inverse filter according to the invention of FIG. 1 and the example of a synthesis filter according to the invention of FIG. 2 are complementary. Also, the time-frequency resolution of the filter structure may be tuned in advance by selecting the transfer functions $H_k$ of the second filters in an appropriate manner since the second filters may be any appropriate type of stable and causal filters, for example by choosing the parameters (such as the gain, poles and zero's) of the transfer function $H_k$ such that the filter is tuned to a particular frequency region.

The delay and the filter and/or the amplifiers may be interchanged, that is the filter and/or amplifiers may be placed before the delay. In that case, the delay will store the first filtered signal $\hat{x}$ and release a preceding first filtered signal which is then combined with the input signal x to obtain the residual signal r. Said in a mathematical manner: the delay device 131 and the filter and/or the amplifiers are commutative. However, independently from the relative position of the delay device, the filter and/or the amplifiers, the filter is communicatively connected to the delay device and the first combiner device.

Furthermore, the parameters used in the inverse filter may be used in the corresponding synthesis filter, for instance in the example in FIG. 2. Thereby, the synthesis filter may be implemented without means for the recomputation of the prediction coefficient and hence the synthesis filter may be cheaper. The settings of the inverse filter may then be transmitted to the synthesis filter, for example via a separate data channel or united with the signal r.

FIG. 2 shows a synthesis filter device or decoder device 2 which is substantially the reverse of the inverse filter device of FIG. 1. The synthesis filter device 2 has an input port 21 connected to a first combiner device 22. The combiner device 22 is further connected to a filter structure 23 and an output 24 of the synthesis filter device 2. At the input 21 an input signal r may be presented. The input signal r is then received by the first combiner device 22 and combined with a first filtered signal from the filter structure 23, whereby an output signal x is obtained. It the input signal r is the residual signal r from the inverse filter device 1 of FIG. 1, the output signal x is substantially similar to the input signal x of the inverse filter device.

The filter structure 23 comprises a delay device 231 (also referred to as a buffer device or a memory device) connected to the output port 24 and a plurality of second filter devices 232. The second filter devices 232 are connected to amplifier devices 233 which are connected to a second combiner device 234. The second combiner device 234 is connected with an output to the first combiner device 12.

The delay device 231 stores the output sample x(n) and releases a previously stored output sample x(n−j), with j larger than zero. The second filter devices 232 generate second filtered signals based on the previously stored output signal. The amplifier devices 233 multiply each second filtered signal with a prediction coefficient $\alpha_1, \alpha_2, \ldots, \alpha_K$. Thus, the second filtered signals are combined as a weighted sum by the second combiner device 234. The output of the second combiner device 234 is the first filtered signal $\hat{x}$ where each sample $\hat{x}(n)$ is thus based on previous samples x(n−j) of the output signal x, with j greater than 0. The second combiner device 234 outputs the first filtered signal $\hat{x}$ and presents the first filtered signal $\hat{x}$ to the first combiner device 1. The first combiner device 22 combines the input signal r with the first filtered signal $\hat{x}$ and obtains the output signal x.

Because of the delay device in the filter structure 23, there are no delay free loops present in the filter structure. Thereby, the synthesis filter may be made complementary to the inverse filter in a simple manner. The delay and the filter and/or the amplifiers may be interchanged, that is the filter and/or amplifiers may be placed before the delay. Said in a mathematical manner: the delay device and the filter and/or the amplifiers are commutative.

In the examples of FIGS. 1 and 2, the second filter devices are connected in parallel to the delay or buffer device. Thus, each sample of each second filtered signal is based on preceding samples of the input signal to the delay or buffer device. The second filter devices may likewise be connected in a cascaded manner. In that case the k-th second filtered signal $y_k$ is based on the k-1-th second filtered signal $y_{k-1}$.

In a device according to the invention, the delay device may have any delay required. Preferably, the delay is such that the preceding signal directly precedes the signal received at the buffer, i.e. the delay is a single delay.

Figure 3:
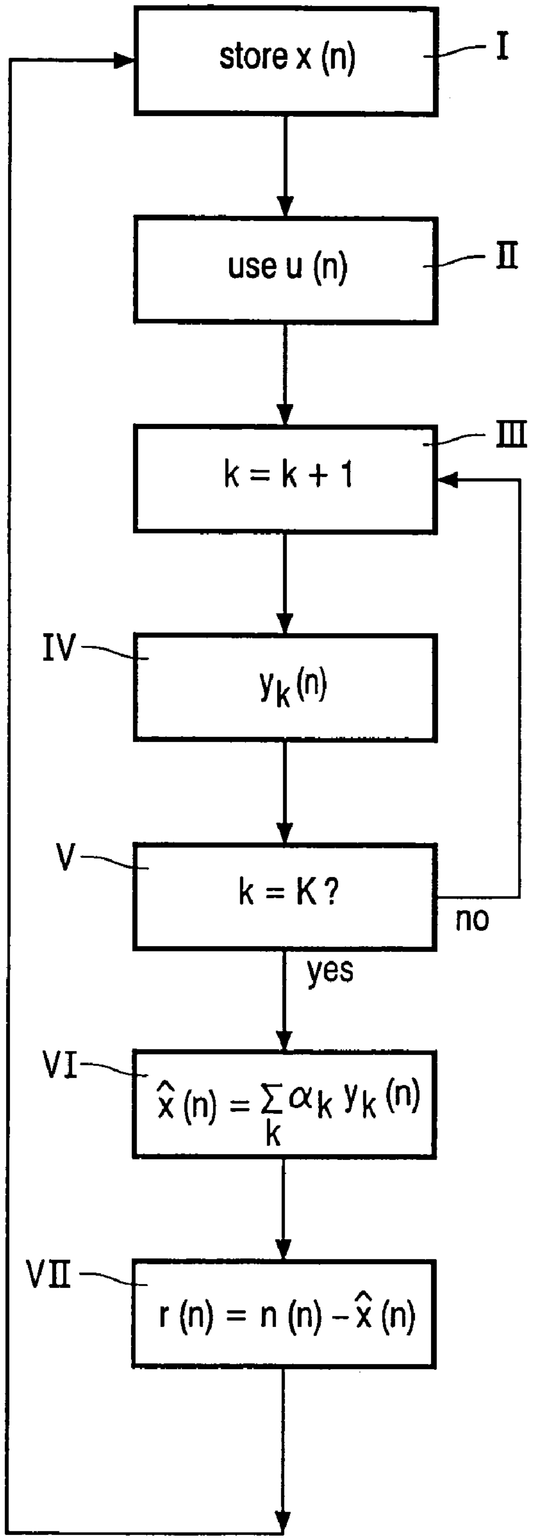
FIG. 3 shows a flow-chart of a first example of an embodiment of an inverse filtering method according to the invention.

FIG. 3 shows a flow-chart of an inverse filtering method according to the invention. In steps I-VI the input sample x(n) is received and the first filtered sample $\hat{x}(n)$ is generated. After step VI, the first filtered sample $\hat{x}(n)$ and the input sample x(n) are combined whereby the residual sample r(n) is obtained in a first combining step VII. In the shown example, the combining in step VII is a subtraction method, but is likewise possible to perform a different operation, as long as a residual signal is obtained which is a measure of the similarities between the input signal and the filtered signal. Thereafter, a next input sample is received and the steps I-VII are performed again.

The generation of the first filtered sample $\hat{x}(n)$ in steps I-VI is started with a storage step I. In the storage step I, the input sample x(n) is received and the input sample x(n) is stored in a buffer. In step II, a preceding input sample u(n) is retrieved from the buffer. In the example, the preceding input sample u(n) is a direct preceding input sample. It is likewise possible to use one or more other preceding samples. Use of only the direct preceding sample allows the buffer to be as small as possible. In step III, a counter value k is adjusted to be a next value k+1. After step III, a second filtering step IV is performed. In the second filtering step a filtering method is performed on the preceding input sample u(n), resulting in a second filtered sample $y_k(n)$. In step V, the counter value k is compared with some predetermined number K, K indicating the total number of second filtering steps to be performed. If the counter value k is not similar to the predetermined number K, the steps II-V are performed again. If the counter value k is similar to the predetermined number K, the second filtered signals $y_1(n), y_2(n), \ldots, y_k(n)$ are combined with some weighting factor $\alpha_k$ in a second combining step VI, whereby the first filtered sample $\hat{x}(n)$ is obtained.

Figure 4:
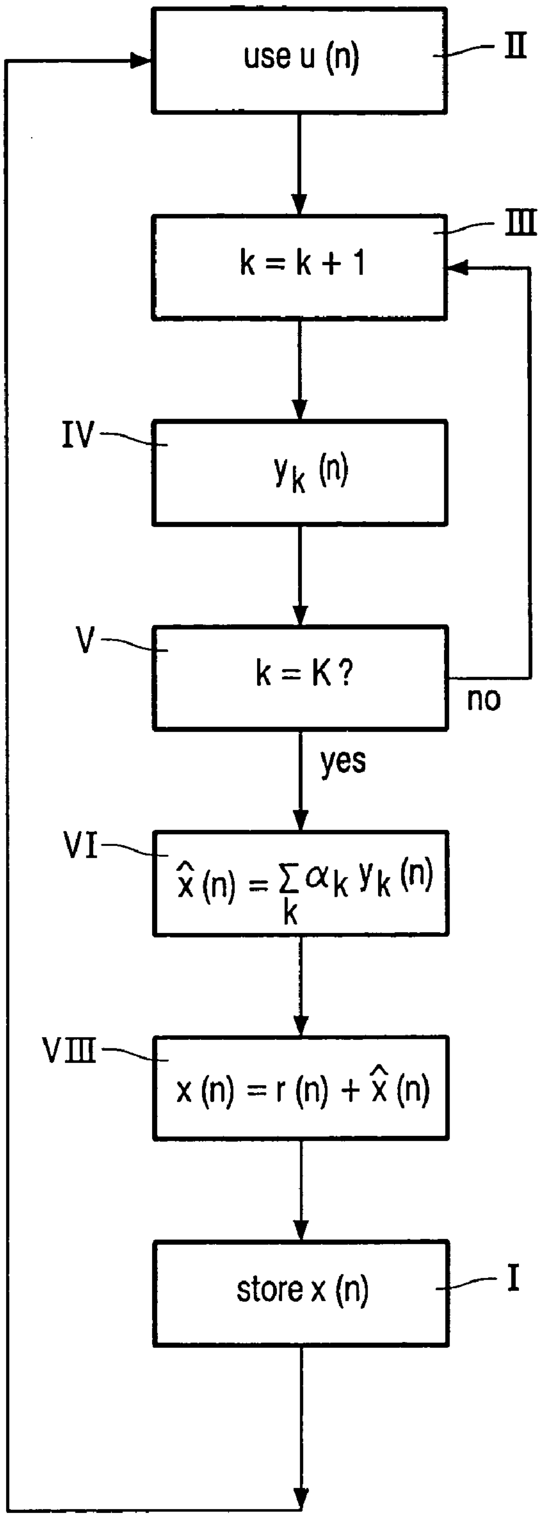
FIG. 4 shows a flow-chart of a first example of an embodiment of a synthesis filtering method according to the invention.

FIG. 4 shows a flow-chart of an example of a synthesis filtering method according of to the invention. The synthesis filtering method represented with the flow-chart of FIG. 4 may for example be performed by the synthesis filter device of FIG. 2.

In step II, a sample u(n) is retrieved from a buffer. The sample u(n) is the preceding output sample x(n−1). In step III, a counter value k is adjusted to be a next value k+1. After step III, a second filtering step IV is performed. In the second filtering step a filtering method with a transfer function $H_k(z)$ is performed on the sample u(n), resulting in a second filtered sample $y_k(n)$. In the step V, the counter value k is compared with some predetermined number K, indicating the total number of second filtering steps to be performed. If the counter value k is not similar to the predetermined number K, the steps II-V are performed again. If the counter value k is similar to the predetermined number K, the second filtered samples $y_1(n), y_2(n), \ldots, y_k(n)$ are combined with some weighting factor $\alpha_k$ in a second combining step VI, whereby a first filtered sample $\hat{x}(n)$ is obtained. In a first combining step VIII an input sample r(n) is combined with the first filtered sample $\hat{x}(n)$, whereby an output sample x(n) is obtained. Thereafter, the output sample x(n) is stored in the buffer and the procedure is repeated.

In a method or device according to the invention, the second filtering steps or second filter devices may be of any type suitable for the specific implementation, as long as they are stable and casual. Furthermore, a method or device according to the invention may besides at least one filter include one or more delays or a direct feed through.

The second filtering steps or filter device may for example be recursive or Infinite Impulse Response (IIR) filtering steps or filter devices. In an IIR method, also delayed and/or weighted samples of the output signal are used to obtain the output signal. Furthermore, at least one of the second filter device may be a non-linear filter device.

The second filtering or filter device may be psycho-acoustically inspired; i.e. having a time-frequency resolution comparable to the human auditory system. For instance, the second filtering or generating at least one second filtered signal may be all-pass filtering with a transfer function:

$$H_k(z) = \left(\frac{z^{-1} - \lambda^*}{1 - z^{-1}\lambda}\right)^{k-1} \quad (1)$$

in which equation (1) $z^{-1}$ represents the delay device, k represents the number of secondary filtering steps which is a positive integer between 1 and K, K represents the total number of secondary filters or filtering steps and $\lambda$ represents a constant having an absolute value between zero and one. The parameter $\lambda$ may for example be chosen such that the filter has a time-frequency resolution comparable to the human auditory system.

Also, the psycho-acoustical inspired filtering may be Laguerre filtering with a transfer function $H_k(z)$ as described by the mathematical algorithm:

$$H_k(z) = \frac{\sqrt{1 - |\lambda|^2}}{1 - z^{-1}\lambda}\left\{\frac{z^{-1} - \lambda^*}{1 - z^{-1}\lambda}\right\}^{k-1} \quad (2)$$

In this equation (2), k represents the number of recursive filtering steps, $z^{-1}$ represents the delay and $\lambda$ is a parameter having an absolute value between zero and one.

It is also possible to implement the second filtering as Kautz filtering with a transfer function $H_k(z)$ as described by the mathematical algorithm:

$$H_k(z) = \frac{\sqrt{1 - |\lambda_k|^2}}{1 - z^{-1}\lambda_k}\prod_{m=1}^{k-1}\frac{z^{-1} - \lambda_m^*}{1 - z^{-1}\lambda_m} \quad (3)$$

In equation (3), k represents the number of recursive filtering steps, $z^{-1}$ represents the delay operation and $\lambda_m$ is a parameter having an absolute value between zero and one and $\lambda^*_m$ is the complex conjugate value of $\lambda_m$.

The second filtering may also be Gamma-tone filtering or a digital analogon of a Gamma-tone filter bank, as is for example known from T. Irino et. al., "A time domain, level dependent auditory filter", *J. Acoust. Soc. Am.,* 101:412-419, 1997. In general, Gamma-tone filters are continuous-time filters having an impulse response $h_k$ defined by $$h_k(t) = t^{\gamma_k - 1} e^{\sigma_k t} \cos(\omega_k t + \Phi_k) \quad (4)$$

wherein the parameters are tuned in accordance with the pertinent psycho-acoustic data. In this equation, the term $t^{\gamma_k - 1} e^{\sigma_k t}$ represents a statistical Gamma-distribution, $\omega_k$ represents the frequency or tone of the cosine-term, t the time and $\Phi_k$ the phase.

After the second filtering, some extra processing may be performed, such as a matrix operation. The combined transfer function of the filtering and the matrix operation may then be represented by the mathematical algorithm:

$$H_k(z) = \sum_{n=1}^{K} c_{kn} G_n(z) \quad (5)$$

in which algorithm $H_k(z)$ represents the combined transfer function of the second filters and the matrix, k represents the number of filtering steps, $c_{kn}$ represents a value of the matrix element at position k,n in the matrix, $G_n(z)$ represents the transfer function of the second filter n. In equation (5), the filters $G_n(z)$ may for example be Laguerre filters as defined by equation (2) or Kautz filters as defined by equation (3).

For example the second filtered signals $y_1, y_2, \ldots, y_k$ may be multiplied with a Fourier matrix. In that case the matrix values $c_{kn}$ of equation (5) may chosen to be:

$$c_{kn} = w(n) e^{i2\pi(n-1)(k-1)/K} \quad (6)$$

In this equation (6), w represents some weighing function, i represents the square root of −1,K represents the number of second filter sections A filter device and filtering method according to the invention may be applied in data compression applications, such as linear predictive coding. For example, in a coding system comprising an encoder device and a decoder device communicatively connected to the encoder device, the encoder device may comprise an inverse filter device according to the invention and the decoder device may comprise a synthesis filter device according to the invention.

In a prediction filter or prediction encoder or decoder, the prediction coefficients $\alpha_1, \alpha_2, \ldots, \alpha_K$ may be obtained using the following procedure. In the shown example, the prediction coefficients are dependent on the signals present in the filter. For example, the prediction coefficient may be based on some optimisation procedure of the (obtained) samples or signals, such as the minimisation of a mean squared error.

For the determination of $\alpha_K$ at time instant n, a piece of the input signal x around n is selected, for example a segment x(t) with $t=\{n-M_1, n-M_1+1, \ldots, n+M_2\}$, with $M_1$, $M_2>K$. Next, the segment x(t) is windowed (e.g., by a Hanning window) to a windowed segment s.

The windowed segment s may then be adapted for a new segment s. For example, the signal may be appended with zeros, some small amount of noise may be added to the signal in order to prevent numerical problems in the matrix inversion (done in a later step), or the signal segment s may be transformed into another segment. This may be done, for instance, to produce a psycho-acoustically relevant signal. In that case, a masked threshold could be calculated from segment s and an inverse Fourier transform could be applied on the masked threshold to obtain its associated time signal.

The, optionally adapted or modified, signal s' is then processed using a filtering method or a filter device according to the invention and the second filtered signals $y_k$ are obtained. The prediction coefficients $\alpha_1, \alpha_2, \ldots, \alpha_K$ are then determined by solving the equation:

$$Qa=P \qquad (7)$$

In which equation (7), $\alpha$ is a vector containing the prediction coefficients: $\alpha=[\alpha_1, \alpha_2, \ldots, \alpha_K]^t$ and Q is a matrix and P is a vector in which the elements are defined by $$Q_{k,l} = \sum_n y_l(n) y_k^*(n) \qquad (8)$$

$$P_k = \sum_n s'(n) y_k^*(n).$$

In this equation (8), k and l are equal or larger than one but smaller than or equal to K and * denotes a complex conjugate. In order to prevent numerical problems associated with the matrix inversion required to determine $\alpha$, known regularisation techniques may be used, such as adding a small offset matrix $\epsilon I$ to matrix Q before inversion, $\epsilon$ representing a small number and I being the identity matrix. The determination of the prediction coefficients may be performed at any time instant n. However, in practice the coefficients may be determined at regular time intervals. Via interpolation techniques, the prediction coefficients may be then determined for other time instants.

Furthermore, a filtering method according to the invention may be applied in an adaptive differential pulse code modulation (ADPCM) method. Likewise, a filtering device according to the invention may be applied in an ADPCM device, as are generally known in the art, for example from K. Sayood "*Introduction to Data compression*", $2^{nd}$ ed. Morgan Kaufmann 2000, chapter 10.5.

Also, a filter device or filtering method according to the invention may be applied in speech or audio coding or filtering.

Figure 5:
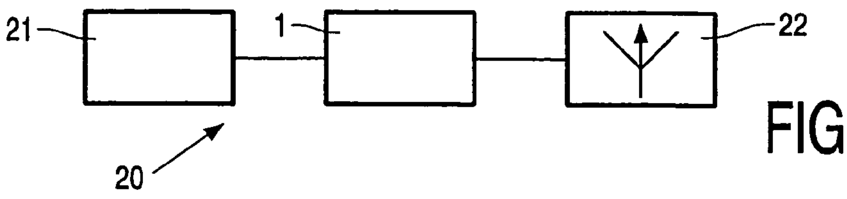
FIG. 5 shows a block diagram of a data transmission device provided with a prediction coder device according to the invention.

Filtering devices according to the invention may be applied in various devices, for example a data transmission device 20, like a radio transmitter or a computer network router that comprises input signal receiver means 21 and transmitter means 22, for example an antenna, for transmitting a coded signal can be provided with a prediction coder device 1 according to the invention that is connected to the input signal receiver means 21 and the transmitter means 22, as is shown in FIG. 5. Such a device may transmit a large amount of data using a small bandwidth since the coding process compresses the data.

Figure 6:
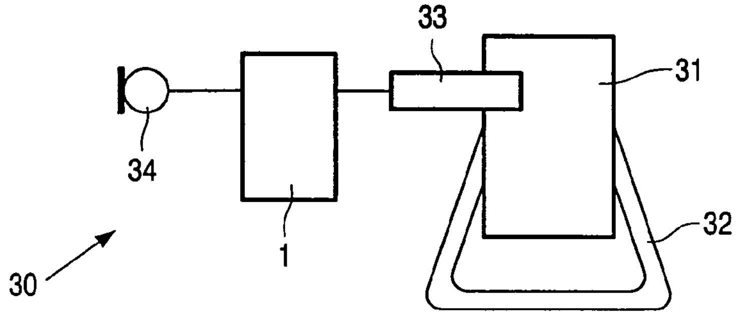
FIG. 6 shows a block diagram of a data storage device provided with a prediction coder device according to the invention.

It is equally possible to apply a prediction coding device 1 according to the invention in a data storage device 30, like a SACD burner, DVD burner or a Mini Disc recorder, for storing data on a data container device 31, like a SACD, a DVD, a compact disc or a computer hard-drive. Such a device 30 comprises holder means 32 for the data container device 31, writer means 33 for writing data to the data container device 31, input signal receiver means 34, for example a microphone and a prediction coder device 1 according to the invention that is connected to the input signal receiver means 34 and the writer means 33, as is shown in FIG. 6. This data storage device 30 is able to store more data on a data container device 31, while disadvantages of the known data storage devices are avoided.

Figure 7:
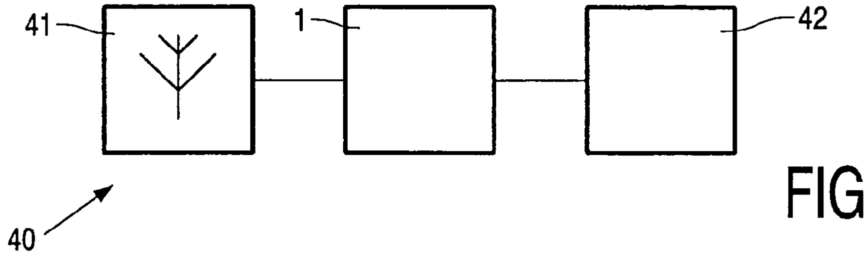
FIG. 7 shows a block diagram of a data processing device provided with a prediction decoder device according to the invention.

It is equally possible to provide a data processing device 40 comprising input signal receiver means 41, like a DVD-rom player and data process means 42 with a decoder device 11 for prediction encoded signals according to the invention, as is shown in FIG. 7. Such a data processing device 40 might be a computer or a television set-top box.

Figure 8:
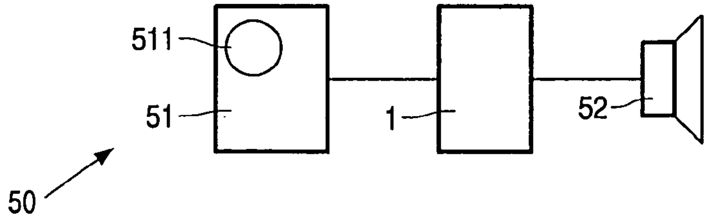
FIG. 8 shows a block diagram of an audio-visual device provided with a prediction decoder device according to the invention.
Figure 9:
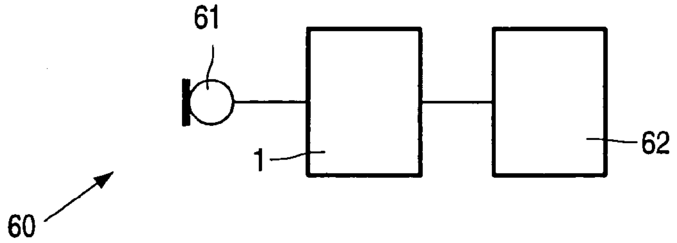
FIG. 9 shows a block diagram of an audio-visual recorder device provided with a prediction decoder device according to the invention.

It is also possible to provide an audio device 50 like a home stereo or multi-channel player, comprising data input means 51, like a audio CD player, and audio output means 52, like a loudspeaker, with a decoder device 11 for prediction encoded signals according to the invention, as is shown in FIG. 8. Similarly, an audio recorder device 60, as shown in FIG. 9, comprising audio input means 61, like a microphone, and data output means 62 can be provided with a prediction coder device 11 thereby allowing to record more data while using the same amount of data storage space.

Figure 10:
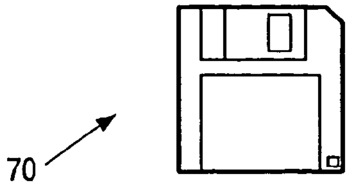
FIG. 10 shows a block diagram of a data container device provided with a prediction coding method according to the invention.

Furthermore, the invention can be applied to data being stored to a data container device like floppy disk 70 shown in FIG. 10, such a data container device might for example also be a Digital Versatile Disc or Super Audio CDs itself or a master or stamper for manufacturing such DVDs or SACDs.

The invention is not limited to implementation in the disclosed examples of devices, but can likewise be applied in other devices. In particular, the invention is not limited to physical devices but can also be applied in logical devices of a more abstract kind or in software performing the device functions. Furthermore, the devices may be physically distributed over a number of apparatuses, while logically regarded as a single device. Also, devices logically regarded as separate devices may be integrated in a single physical device. For example, the buffer or delay device may physically be integrated in the second filter devices, although if may logically be seen as a separate device, for instance by implementing in each second filter device 132 in FIG. 1 a delay device. Also, the inverse or synthesis filter device itself may be implemented as a single integrated circuit.

The invention may also be implemented in a computer program for running on a computer system, at least including code portions for performing steps of a method according to the invention when run on a computer system or enabling a general propose computer system to perform functions of a filter device according to the invention. Such a computer program may be provided on a data carrier, such as a CD-rom or diskette, stored with data loadable in a memory of a computer system, the data representing the computer program. The data carrier may further be a data connection, such as a telephone cable or a wireless connection transmitting signals representing a computer program according to the invention.

In the foregoing specification, the invention has been described with reference to specific examples of embodiments of the invention. It will, however, be evident that various modifications and changes may be made therein without departing from the broader spirit and scope of the invention as set forth in the appended claims. The specifications and drawings are, accordingly, to be regarded in an illustrative rather than in a restrictive sense.

The invention claimed is:

1. An inverse filtering method, at least comprising:

generating (I-VI) a first filtered signal based on an input signal; and combining (VII) said first filtered signal with said input signal for obtaining a residual signal, wherein said generating (I-VI) comprises:

generating (III-V) at least two second filtered signals, each of said second filtered signals not significantly delayed in time relative to each other, said generating being stable and causal;

amplifying at least one of said second filtered signals with an amplification factor, which amplification factor is at least time or signal dependent;

obtaining (VI) said first filtered signal based on said at least two second filtered signals;

storing (I) a first signal related to said input signal in a buffer;

retrieving (II) from said buffer a delayed signal.

2. An inverse filtering method as claimed in claim 1, wherein said storing a first signal related to said input in a buffer and retrieving from said buffer a delayed signal is performed before said generating at least two second filtered signals and said first signal is said input signal and said at least two second filtered signals are is generated based on said delayed signal.

3. An inverse filtering method as claimed in claim 1, wherein said storing a first signal related to said input in a buffer and retrieving from said buffer a delayed signal is performed after said generating at least two second filtered signals and said first signal is said first filtered signal and at least one of said at least two second filtered signals is generated based on said input signal.

4. An inverse filtering method as claimed in claim 1, wherein said delayed sample directly precedes said input signal.

5. An inverse filtering method as claimed in claim 1, wherein said generating of a first filtered signal comprises at least one non-linear filtering step.

6. An inverse filtering method as claimed in claim 1, wherein said generating of at least two second filtered signals comprises at least one recursive filtering step.

7. An inverse filtering method as claimed in claim 6, wherein said generating of at least two second filtered signals comprises at least one all-pass filtering step.

8. An inverse filtering method as claimed in claim 1, wherein said inverse filtering method has a time-frequency resolution comparable to the human auditory system.

9. An inverse filtering method as claimed in claim 1, wherein said generating of at least two second filtered signals comprises at least one Laguerre filtering step.

10. An inverse filtering method as claimed in claim 1, wherein said generating of at least two second filtered signals comprises at least one Kautz filtering step.

11. An inverse filtering method as claimed in claim 1, wherein said generating of at least two second filtered signals comprises a Gamma-tone filtering step.

12. An inverse filtering method as claimed in claim 1, further comprising performing a matrix operation on at least one of said at least two second filtered signals.

13. An inverse filtering method as claimed in claim 1, wherein said amplifying at least one of said second filtered signals comprises multiplying at least one of said second filtered signals with a prediction coefficient, which prediction coefficient is obtained in accordance with a prediction filtering method.

14. An inverse filtering method as claimed in claim 1, wherein said amplifying at least one of said second filtered signals comprises multiplying at least one of said second filtered signals with a prediction coefficient, which prediction coefficient is obtained in accordance with an adaptive pulse code modulation method.

15. A data container device containing data representing signals filtered with a method as claimed in claim 1.

16. A computer program including code portions for performing steps of a method as claimed in claim 1.

17. A data carrier device including data representing a computer program as claimed in claim 16.

18. A data stream comprising at least one signal obtained with a method as claimed in claim 1.

19. A data stream as claimed in claim 18, further comprising data related to said amplifying said second filtered signal.

20. A synthesis filtering method, at least comprising:

combining (VIII) a first filtered signal with an input signal for determining an output signal;

generating (I-VI) a first filtered signal from said output signal, wherein said generating comprises:

generating (III-V) at least two second filtered signals, each of said second filtered signals not significantly delayed in time relative to each other, said generating being stable and causal;

amplifying at least one of said second filtered signals with an amplification factor, which amplification factor is at least time or signal dependent;

obtaining (VI) said first filtered signal based on said at least two second filtered signals;

storing (I) a first signal related to said input signal in a buffer;

retrieving (II) from said buffer a delayed signal.

21. An inverse filter device, at least comprising:

an input port (11)for receiving an input signal;

a first combiner device (12) connected to said input port, for calculating a residual signal by combining a first filtered signal with said input signal;

a filter structure (13) connected to said input port and said first combiner device for generating a first filtered signal based on said input signal and presenting said first filtered signal to said first combiner device;

said filter device further comprising: an output port (14) connected to said first combiner device for outputting said residual signal, wherein said filter structure (13) comprises:

a buffer device (131) connected for storing a first signal and releasing a delayed signal;

at least one stable and causal second filter device (130; 132) communicatively connected to said buffer device and said first combiner device, for generating at least two second filtered signals, each of said second filtered signals not significantly delayed in time relative to each other, based on said input signal;

at least one amplifier device (133) connected to the output of at least one second filter device, said amplifier device having an amplification factor, which amplification factor is at least time or signal dependent;

and a second combiner device (134) connected to at least one of said at least one amplifier devices for obtaining said first filtered signal from said at least two second filtered signals.

22. A data transmission device comprising input signal receiver means, transmitter means for transmitting a coded signal and a filter device as claimed in claim 21 connected to the input signal receiver means and the transmitter means.

23. A data storage device for storing data on a data container device, comprising holder means for a data container device, writer means for writing data to the data container device, input signal receiver means and a filter device as claimed in claim 21 connected to the input signal receiver means and the writer means.

24. An audiovisual recorder device, comprising audiovisual input means, data output means and a filter device as claimed in claim 21.

25. A coding system, comprising:

an encoder device and a decoder device communicatively connected to said encoder device, wherein said encoder device comprises at least one inverse filter device as claimed in claim 21.

26. A synthesis filter device at least comprising:

an input port (21) for receiving an input signal, a first combiner device (22) for combining said input signal with a first filtered signal, whereby an output signal is obtained;

a filter structure (23) connected to said input port and said first combiner device for generating a first filtered signal based on said output signal and presenting said first filtered signal to said first combiner device;

said filter device further comprising an output port (22) connected to said first combiner device for outputting said residual signal, wherein said filter structure comprises: a buffer device (231) for storing a first signal and releasing a delayed signal;

at least one stable and causal second filter device (230; 232) communicatively connected to said buffer device and said first combiner device, for generating at least two second filtered signals based on said input signal, said second filtered signals not significantly delayed in time relative to each other;

at least one amplifier device (233) connected to the output at least one second filter device, said amplifier device having an amplification factor, which amplification factor is at least time or signal dependent;

a second combiner device (234) connected to at least one of said at least one amplifier devices for obtaining said first filtered signal from said at least two second filtered signals.

27. A data processing device comprising input signal receiver means, data processing means and a filter device as claimed in claim 26 communicatively connected to the input signal receiver means and the data processing means.

28. An audiovisual device, comprising data input means, audiovisual output means and a filter device as claimed in claim 26.

29. An inverse filtering method, at least comprising:

generating (I-VI) a first filtered signal based on an input signal; and combining (VII) said first filtered signal with said input signal for obtaining a residual signal, wherein said generating (I-VI) comprises:

generating (III-V) at least one second filtered signal, said generating being stable and causal;

amplifying at least one of said second filtered signals with an amplification factor, which amplification factor is at least time or signal dependent;

obtaining (VI) said first filtered signal based on said at least one second filtered signal;

storing (I) a first signal related to said input signal in a buffer and retrieving (II) from said buffer a delayed signal; wherein:

said storing and retrieving steps are performed after said generating at least one second filtered signal;

said first signal is said first filtered signal; and, said at least one second filtered signal is generated based on said input signal.

* * * * *